US006758364B1

(12) United States Patent
Röhrig (10) Patent No.: US 6,758,364 B1
(45) Date of Patent: Jul. 6, 2004

(54) CONTAINER CAP FOR DRINKING CONTAINERS HAVING A VALVE BODY INSERT WITH A DEFORMABLE SEALING LIP

(75) Inventor: Peter Röhrig, Vienna (AT)

(73) Assignee: BAMED AG, Altendorf (CH)

( * ) Notice: Subject to any disclaimer, the term of this patent is extended or adjusted under 35 U.S.C. 154(b) by 0 days.

(21) Appl. No.: 09/646,165

(22) PCT Filed: Feb. 4, 1999

(86) PCT No.: PCT/AT99/00028
§ 371 (c)(1),
(2), (4) Date: Sep. 14, 2000

(87) PCT Pub. No.: WO99/47029
PCT Pub. Date: Sep. 23, 1999

(30) Foreign Application Priority Data

Mar. 18, 1998 (AT) .............................................. 476/98

(51) Int. Cl.[7] .............................................. A47G 19/22
(52) U.S. Cl. ...................... 220/714; 220/717; 220/703; 220/711; 215/387
(58) Field of Search ................................ 137/854, 860; 222/494, 212; 215/387–389, 11.4, 11.5, 311, 309; 220/711, 714, 717, 719, 731, 203.11, 203.13, 203.19, 705, 703, 231

(56) References Cited

U.S. PATENT DOCUMENTS

| | | | | |
|---|---|---|---|---|
| 3,249,268 A | * | 5/1966 | Neuner | |
| 3,511,407 A | * | 5/1970 | Palma | 215/11.1 X |
| 3,704,803 A | * | 12/1972 | Ponder | |
| 3,949,780 A | | 4/1976 | Buckman | |
| 4,207,870 A | * | 6/1980 | Eldridge | 137/854 |
| 4,303,170 A | * | 12/1981 | Panicci | 215/387 X |
| 4,307,731 A | * | 12/1981 | Kaufman | 137/854 |
| 4,420,101 A | * | 12/1983 | O'Neill | |
| 4,527,594 A | * | 7/1985 | Garneau | 137/854 |
| 4,545,491 A | | 10/1985 | Bisgaard et al. | |
| 4,586,621 A | * | 5/1986 | Dahan | |
| 4,623,069 A | * | 11/1986 | White | |
| 4,699,300 A | * | 10/1987 | Blake | |
| 4,739,906 A | * | 4/1988 | LoTurco | |
| 4,967,922 A | * | 11/1990 | Alder | 215/309 |
| 5,079,013 A | * | 1/1992 | Belanger | 215/11.4 X |
| 5,277,171 A | * | 1/1994 | Lannes | 137/854 X |
| 5,431,290 A | * | 7/1995 | Vinciguerra | 215/11.5 |
| 5,542,670 A | * | 8/1996 | Morano | 215/387 X |
| 5,641,097 A | * | 6/1997 | Renault et al. | 222/321.2 |
| 5,706,973 A | | 1/1998 | Robbins, III et al. | |
| D407,269 S | * | 3/1999 | Fletcher | 220/717 X |

FOREIGN PATENT DOCUMENTS

| | | |
|---|---|---|
| DE | 29706653 | 7/1997 |
| EP | 0064427 | 11/1982 |
| FR | 2705561 | 4/1993 |
| GB | 2314497 | 7/1998 |

* cited by examiner

*Primary Examiner*—Robin A. Hylton
(74) *Attorney, Agent, or Firm*—Ladas & Parry (57) ABSTRACT

A container cap (2) for a drinking container (1) comprising at least one one-way drinking valve (3) adjacent at least one drinking opening (25), a cylinder-type closed valve seat (5) and a valve body (6) abutting the valve seat (5) in the closing position is proposed. The valve body (6) comprises a tubular sealing lip (7) made of an elastomeric material which in the closing position abuts on the valve seat (5) from within, and which is integrally connected with a base part (8). The base part (8) is part of a connecting body (17) which at the same time forms a base part (18) for an elastomeric, tubular valve body (19) of an air valve (4) which is slipped onto a tubular valve seat (20) in the region of at least one opening (26) of the container cap (2), whereby a one-piece, elastomeric valve body insert (23) is formed.

24 Claims, 5 Drawing Sheets

CONTAINER CAP FOR DRINKING CONTAINERS HAVING A VALVE BODY INSERT WITH A DEFORMABLE SEALING LIP

The invention relates to a container cap for a drinking container, e.g. a screw cap lid including a drinking spout or nipple, said container cap comprising at least one one-way drinking valve adjacent at least one drinking opening, a valve seat extending substantially transversely to the main plane of the container cap, and a valve body which in its closing position abuts on the valve seat. Furthermore, the invention relates to a valve body insert for such a container lid for a drinking container, as well as to a drinking container.

Such container caps for drinking containers are used, e.g., to facilitate drinking for infants or persons for whom drinking is difficult because they are physically disabled. Such container caps may also be used in drinking bottles used by people doing sports. The container cap sealingly closes the container so that the liquid present in the container can flow only through the drinking opening(s). In this connection it is, however, important that the liquid does not unintentially flow out when the container is tilted or shaken. To this end, drinking valves are applied which open and allow passage of the liquid only if the drinking opening, e.g. a drinking spout, is sucked at.

Moreover, it is also known to use air valves on the container so as to compensate for a negative pressure which is caused in the container interior when liquid is sucked from the container. U.S. Pat. No. 4,545,491 A, e.g. discloses a feeding bottle comprising an air valve in its bottom; there it is, however, disadvantageous that with a view to its mounting and cleaning, the air valve requires a separate bottom part, in addition to the upper bottle lid with the nipple,, and that the air valve may get clogged relatively easily because of its arrangement on the bottom.

A drinking valve and an air valve may also be applied at the container cap side by side, as is shown in U.S. Pat. No. 5,542,670 A. In this instance, the container cap has a drinking spout which is connected with the container interior via the drinking valve, and next to it the air valve is arranged. The two valves are realized by an elastomeric body which is seated on cylindrical elements that project from the container interior. In detail, the valves are formed in that cross-shaped slots are provided in thin diaphragm parts of the elastomeric body, which slots widen when the spout is sucked at and when a negative pressure forms in the container interior, respectively, so that liquid, or air, respectively, may pass through the respective cross-shaped slot. If there is no pressure difference, these diaphragm parts will close again so as to prevent the passage of liquid or air, respectively. This valve construction is easy to clean, yet is suffers from a number of disadvantages: For instance, if the drinking container is shaken more severely, liquid may leak and be spilled through the cross-shaped slots which then will open somewhat. Also, the operability will not be ensured after some time has passed, since the elastic properties of the elastomeric body will decrease so that perfect opening and closing of the cross-shaped slots will no longer be ensured. Moreover, e.g., in case of a pulp or fruit juice comprising particles, part of the substance may adhere easily in the cross-shaped slots, whereby the valves will be kept open so that also for this reason further substance may emerge from the container unimpeded. Furthermore, it is disadvantageous that the drinking container cannot be completely emptied by drinking because of the valve formation described, since always residual liquid corresponding to the height of the cylindrical elements and the elastomeric body will remain in the container, if the container is pivoted during drinking. Moreover, when sucking has ceased, a relatively large volume of liquid will remain in the drinking spout outside of the drinking valve, which liquid may leak out of the drinking spout when the container is turned or shaken.

According to U.S. Pat. No. 5,079,013 A (and similarly, according to GB 2,314,497 A), a drinking valve and an air valve are provided side by side on a container cap of a drinking vessel. There, the drinking valve is formed as a disk valve (or a plug valve, respectively) which is held in its closed state by means of a helical spring. When a drinking spout located thereabove is sucked at, the valve body is lifted off its valve seat contrary to the spring force, whereby the opening will be freed for dispensing liquid from the container interior. According to U.S. Pat. No. 5,079,013 A, the air valve is a ball valve, with the ball being pressed by a helical spring against a valve seat provided on the container cap. The ball valve is mounted in a cylindrical element which projects into the container interior. According to GB 2,314,497, however, the air valve is formed by a gas-permeable diaphragm. The drinking valve does meet the purpose for which it is provided, i.e. to ensure a seal even if the container is tilted or shaken, yet this known embodiment has other grave disadvantages. Thus, the valves are difficult to mount and, particularly, hardly cleanable which constitutes a health hazard for the person drinking from the drinking container. For a thorough cleaning, the valves would have to be disassembled, which would be unreasonable for such a use. Moreover, the production with the numerous individual valve parts and their assembly is very complex. A further disadvantage consists in that also here the liquid cannot be sucked out completely from the container, and that,moreover, residual liquid will remain in the drinking spout after closure which may flow out of the container when the latter is turned or shaken, which is particularly unsuitable with drinking containers if they are held by infants.

Thus, it is an object of the invention to provide a container cap for a drinking container of the initially defined type, which has a simple, yet nevertheless reliably opening and closing valve construction which is easy to mount and easy to take off, which can be cleaned well and without any problems, and which, in particular, also enables complete emptying of the container during drinking.

The container cap according to the invention of the initially defined type is characterized in that the valve body comprises at least one sealing lip made of an elastomeric material which abuts on the valve seat in the closing position. In this case, the arrangement is such that the sealing lip is provided at the outlet side of the valve seat which is provided with the valve opening(s). If a negative pressure prevails at the outlet end of the drinking valve, i.e., during sucking at, e.g., the drinking spout, in this embodiment the sealing lip will lift off the valve seat, whereby a passage is created for the liquid to be drunk—which may also be viscous or pulp-like. As soon as the negative pressure ceases, the sealing lip will move back into its original closing position, thus again preventing any passage.

For the formation of a drinking valve, or its valve seat, respectively, a compartment of angular cross-section would be possible in principle, with the sealing lips, e.g., abutting from within on oppositely arranged valve seat walls and being lobe-shaped. For a construction which is easy to produce and functions reliably, it is, however, advantageous if the valve seat is circumferentially closed and the sealing lip has a tubular configuration and, in the closing position, abuts the valve seat from within. A valve seat of oval cross-section would be conceivable, yet with a view to its production, a valve seat of circular cross-section is better suited. The valve seat may have cylindrical shape or be conically formed. The sealing lip and the valve seat may thus extend straight, with unchanging diameter in axial direction, or with a cross-section or diameter, respectively, which increases or decreases.

For a simple mounting it is suitable if the sealing lip is integrally connected with a base part. The base part may serve for fastening the valve body, it being possible to simply pull the sealing lip off the valve seat for cleaning purposes, without, however, having to pull directly on the sealing lip (by which it could possibly be damaged).

In connection with this aspect, the invention also relates to a valve body insert which is easy to produce, easy to mount and cleanable without any problems and which is characterized in that at least one, e.g. tubular, sealing lip is integrally connected with a base part that serves for fastening purposes.

An advantageous embodiment for a simple, yet nevertheless stable fit of the valve body on the valve seat is obtained if the base part of the valve body is slippable or slipped onto a socket-like or socket formed valve seat extension. In this instance, the valve seat extension projects into the interior of the container, and the base part may have a sufficiently deep depression or a sufficiently high outer wall, respectively, optionally at a distance from the inner wall, and thus may be pushed onto the valve seat extension from the front-end side thereof; however, it would also be conceivable that the base part does not project or projects merely slightly beyond the valve seat extension, i.e. is substantially arranged within the valve seat extension, wherein it may also be held by positive locking on the inner sie of the socket-like valve seat extension, i.e. by means of knob-shaped latching projections on its outer side.

It is particularly advantageous if the socket-like valve seat extension has at least one, e.g. end-side, thickening or depression for snapping the base part of the valve body thereonto. However, also a latching bead or, generally, a latching projection in another region, e.g. in the central region, of the valve seat extension would be conceivable, yet by the end-side arrangement, the shape of the base part is made easier. The thickening, or the latching projection, respectively, may extend over the entire periphery, yet it may also be provided merely at individual sites, e.g. at diametrically opposite sites of the socket-like extension. Of course, the latching projection may also be mounted on the base part and cooperate with a latching depression in the valve seat extension. By snapping the base part onto the socket-like extension, an (axial) slipping of the sealing lip on the valve seat is prevented with great certainty so that the correct position of the sealing lip on the valve seat will remain ensured, and, moreover, when mounting the valve body on the valve seat extension, the snapping in will provide a "signal", which can be felt and heard, for the correct position of the sealing lip on the valve seat, facilitating the assembly also by untrained persons, e.g. after cleaning.

Principally, it would also be conceivable to provide the latching thickening outwardly and/or inwardly—on the socket-like valve seat extension without a counter-piece on the valve body base part, so that its retention will be ensured as a consequence of the elastic material impression of the base part. To further minimize the possibility of a slipping of the sealing lip on the valve seat, it is, however, particularly suitable if the base part of the valve body has at least one latching groove corresponding to the thickening of the valve seat extension. If the thickening on the valve seat extension is provided at an end side thereof, suitably at least one undercut plug-in groove is provided in the base part, in which, when mounted, the front-end part of the connecting-piece-like valve seat extension will be received. The latching groove of the base part advantageously is precisely adapted to the thickening of the valve seat extension in terms of site and size. In this manner, an exact, stable fit is attained between the sealing lip and the valve seat in a defined position.

A particularly suitable embodiment is provided if the base part of the valve body has at least two latching grooves arranged one above the other which cooperate with one and the same thickening of the valve seat extension to attain different latching positions. In this manner, the thickening of the valve seat extension May latch into the latching groove arranged further upwardly or further outwardly, wherein more than merely the front part of the sealing lip will rest on the valve seat—which here preferably is conical, whereby a comparatively low sealing pressure is obtained and thus only a slight suction pressure need be applied during drinking. This is particularly suitable for infants who are not yet able to suck sufficiently strongly. The valve body may, however, be further pushed into the valve seat if the thickening of the valve seat extension latches into the deeper further inwardly arranged latching groove. A substantially larger part of the sealing lip will then rest on the valve seat so that a stronger suction pressure will be required to lift the sealing lip off the valve seat and suck liquid out of the container. This adjusted position will be suitable for infants who are already capable of sucking more strongly and with whom there is a higher risk of the drinking container being shaken and thrown away and thus, of liquid flowing out of the drinking container.

An embodiment which is particularly suitable for infants consists in that the elastomeric sealing lip is integrally connected with a displacement body that projects into the drinking spout of the container cap leaving clear a passage channel. The displacement body may be approximately piston-shaped and advantageously has a shape that is adapted as precisely as possible to the inner wall of the drinking spout, so that a gap will remain which is as small as possible and, optionally, annular. In this manner, the remaining residual liquid in the drinking spout after sucking has ceased will be substantially reduced, and if the drinking container is shaken or turned over later on, practically no liquid will be spilled or splashed, to which also the surface tension of the remaining liquid will contribute.

It is advantageous if the socket-like valve seat extension has at least one longitudinal slot for liquid to pass therethrough. The longitudinal slot ensures the passage of liquid to the valve proper, even if the sealing lip is integrally connected with the base part in this region, and, depending on the viscosity of the liquid, it may be wider or narrower; the longitudinal slot may be closed or open towards the front-end-side free end of the socket-like valve seat extension, and it may have a greater or shorter length. In this manner, liquid may easily get to the valve seat so that sufficient liquid can be sucked out of the container.

For a simple snapping in of the thickening at the valve seat extension-also into the outer one of the two latching grooves it is advantageous if at least one radial web is provided in the more inwardly located latching groove, the web being as high as this inner latching groove and fitting into at least one longitudinal slot at the front-side end. The web, if aligned with the longitudinal slot, may penetrate into the latter so that a complete pushing on of the base part onto the valve seat extension is possible so that the thickening will latch in the wider latching groove and the sealing lip will abut on the valve seat by its entire length; However, if the base part is rotated, the web will form a stop when the base part is pushed onto the valve seat extension as soon as the position has been reached in which the thickening at the valve seat extension can snap into the farther outwardly arranged latching groove, so that the thickening will latch into this latching groove and merely the upermost part of the sealing lip will abut on the valve seat.

For a good passage of liquid to the valve seat, it is here also advantageous if (respective) two longitudinal slots or longitudinal channels aligned therewith are interconnected via a peripherally extending depression bordering on the valve seat. However, it would also be conceivable that one (respective) axial depression departs from the (respective) longitudinal slot and borders on the valve seat. With a larger number of longitudinal slots, also several or all of the longitudinal slots may be interconnected via an, e.g. annular, depression. This depression will encourage the passage of sufficient liquid to the valve seat.

For a complete emptying of the container, at any event, it is advantageous if the longitudinal slot extends as far as to the site of the junction between the socket-like valve seat extension and the main plane of the container lid.

According to a preferred embodiment it is provided that the base part, via a connecting body, is connected in one piece with a base part for at least one elastomeric, tubular valve body of an air valve further provided in a manner known per se, which is slipped onto a tubular valve seat extending substantially transversely to the main plane of the container lid in the region of at least one air entry opening. When liquid is drunk, i.e., sucked, from the container, a negative pressure will establish in the container as compared to the surrounding pressure, and the higher outer air pressure thus will press onto the inner side of the elastomeric tubular valve body, whereby the latter will be slightly lifted off the valve seat; in this manner, air may flow between the valve body and the valve seat into the interior of the container, whereby a pressure equalization will occur. By the fact that now the valve bodies for the air valve and for the drinking valve are connected in one piece and formed of an elastomeric material, both can be put onto the container cap proper simultaneously in a single procedure, and pulled off the same again, which makes mounting and particularly cleaning especially easy. Also the production of this embodiment is uncomplicated.

A particularly suitable embodiment with a view to the design of the drinking valve with several, e.g. two, latching positions consists in that the connecting body forms base parts for several, e.g. two, elastomeric, tubular valve bodies of an air valve. In this way, always one of the tubular valve bodies—depending on the rotational position of the drinking valve base part—may be slipped onto the tubular valve seat of the air valve, so that in each of the drinking valve latching positions, a complete air valve will be available.

For a safe entry of air into the container also at a rather slight pressure difference, an advantageous embodiment consists in that the tubular valve seat of the air valve is formed with at least one slot-shaped air passage. The number of these air passages is just as variable as their widths and lengths. For a proper functioning as well as an easy production, two oppositely arranged slots open towards the end of the valve seat have proven particularly suitable in practical tests. An equalization of the negative pressure is possible even if drinking is very rapid.

For an optimum venting, it is particularly suitable if the slot length of the slot-shaped air passage is at least equal to half the height of the valve seat.

For a particularly easy pulling off of the integral valve body insert thus present it is advantageous if at least one handle projects from the connecting body. The e.g. plate-shaped, handle suitably.is attached such that all valve bodies will detach simultaneously from the valve seats if the handle is pulled. The handle facilitates handling, and a possible tearing or deformation is prevented. Moreover, an overall "bulky" design of the valve body insert is achieved, safely counteracting a swallowing by the child and meeting the so-called "small part" test frequently prescribed.

A construction which is suitable for a simple cleaning in a dishwasher consists in that the connecting body or the handle has at least one hole. Two holes would be conceivable, one on either side of the handle. With the assistance of the hole, the valve insert can be attached in a dishwasher on the rods of basket inserts.

The valve body (valve body insert) generally consists of rubber or of a rubber-like plastic, particularly preferably of silicone caoutchouc or a thermoplastic elastomer. In this manner, the elastomeric properties and also the stability relative to drinks and food stuffs, and also a safe application in terms of health standards, and a long useful life are provided. On the other hand, the container insert may, e.g., be made of polypropylene (PP), polyethylene (PE) or polycarbonate (PC).

The invention will be explained in more detail by way of preferred exemplary embodiments illustrated in the drawings, to which, however, it shall not be restricted. In the drawings, in detail.

Figure 1:
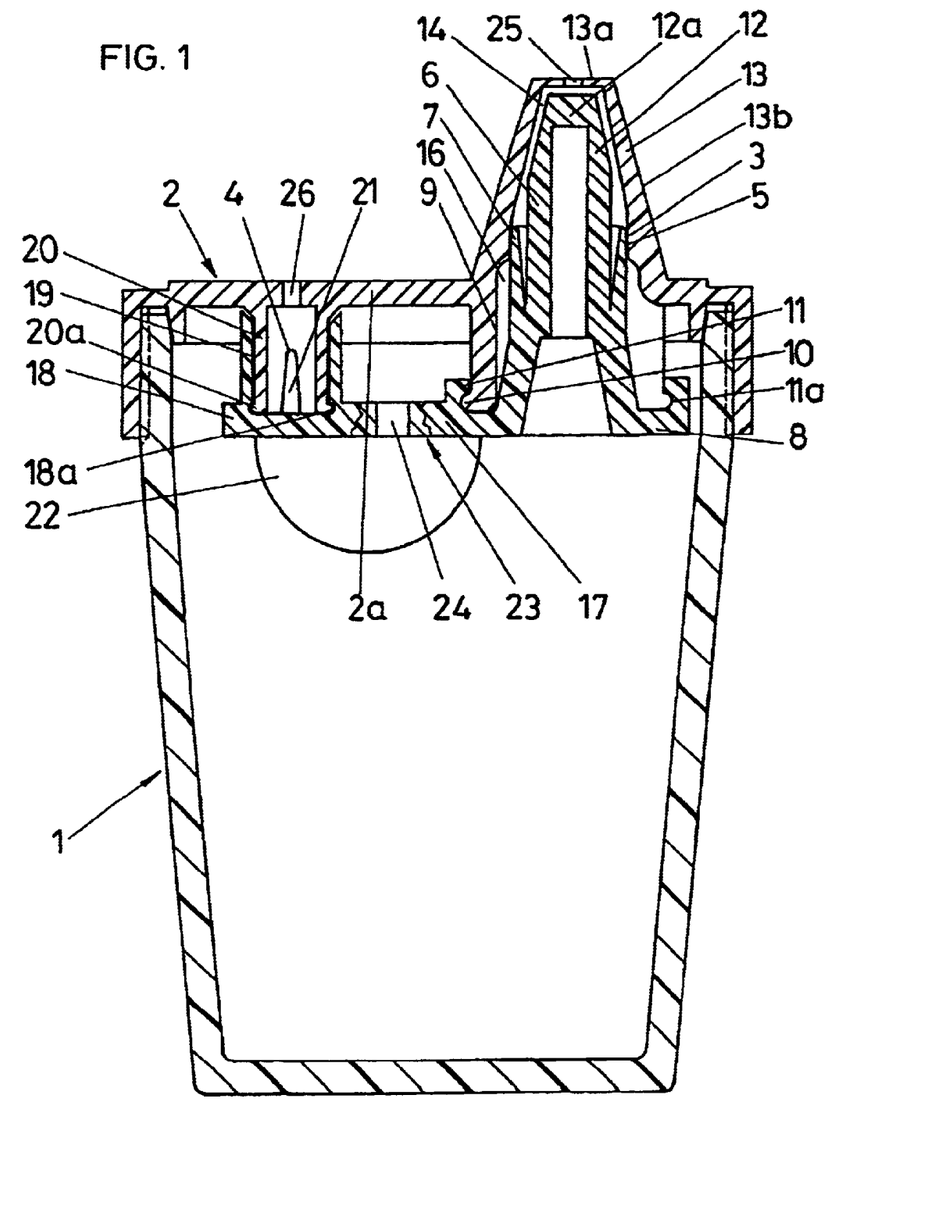
FIG. 1 shows an axial section of a drinking container comprising a container cap with a drinking valve and an air valve, according to line II—II of FIG. 3, with the valves being illustrated in the normal closing position.

In FIG. 1, a drinking container 1 having a container cap 2 according to the embodiment of the invention particularly preferred at present is illustrated, a drinking valve 3 and an air valve 4 being provided on the container cap 2. The drinking valve 3 is comprised of a cylinder-like, circumferentially closed valve seat 5 and a valve body 6 having a tubular sealing lip 7 which in the closed position abuts on the valve seat 5 from within. This sealing lip 7 is integrally connected with a base part 8 which is slipped onto a socket-like valve seat extension 9; in doing so, and end-side thickening 10 of the valve-seat extension 9 is accommodated in a plug-in depression 11 of the base part 8 outwardly undercut to form a latching groove 11.

Furthermore, a displacement body 12 is integrally connected with the sealing lip 7 and with the base part 8, respectively; in the exemplary embodiment illustrated, this displacement body 12 is hollow (for cleaning purposes it could, however, also be solid), yet closed on its upper side 12a, and it projects into a drinking spout 13 of the container cap 2, leaving clear a passage channel 14. For this purpose, as appears from FIG. 8, the displacement body 12 may change from a circular cross-section at its base to an oval, elongated cross-section at its upper side 12a, i.e. it may have "flattened portions" on two opposite sides, whereby the passage channel 14 is defined on either side of the displacement body 12. However, also an annular passage channel may be provided.

Figure 3:
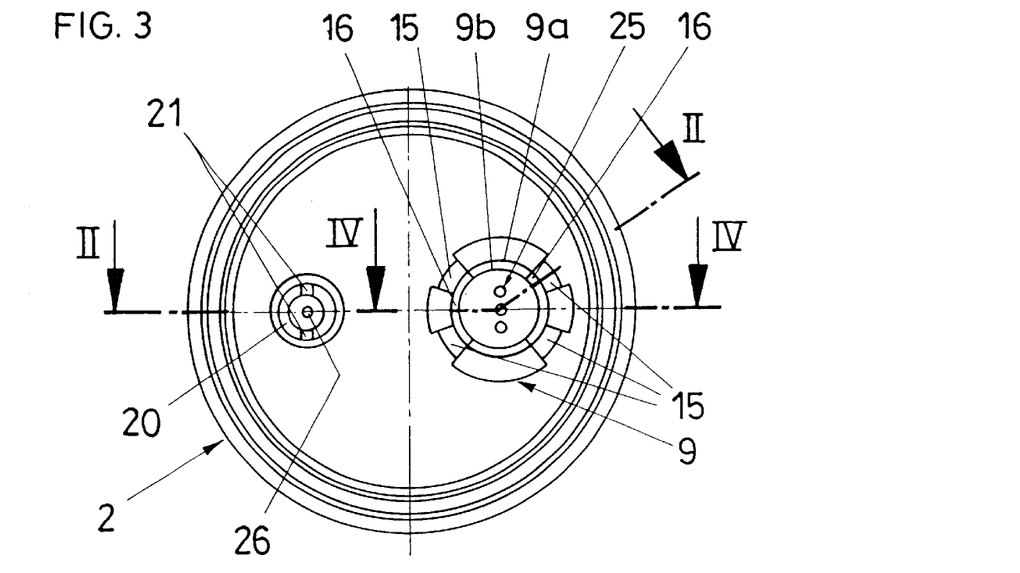
FIG. 3 shows a view of the container cap (without valve body insert) from below, according to arrow III of FIG. 2.
Figure 4:
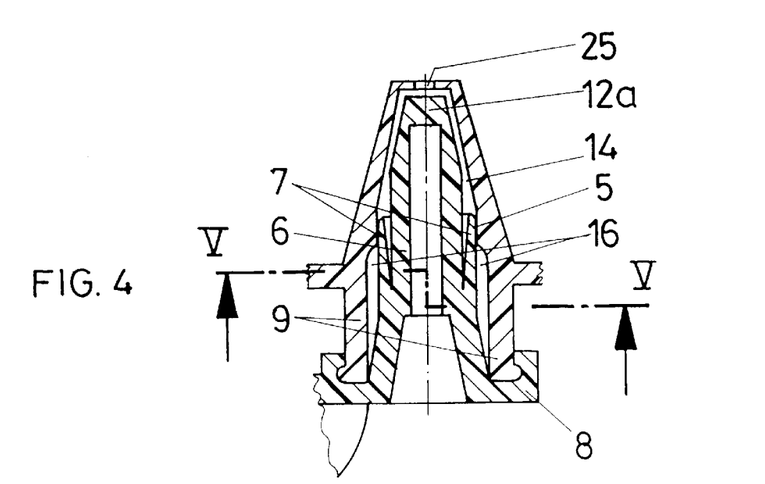
FIG. 4 shows a section through the drinking valve and the drinking spout according to line IV—IV of FIG. 3.
Figure 5:
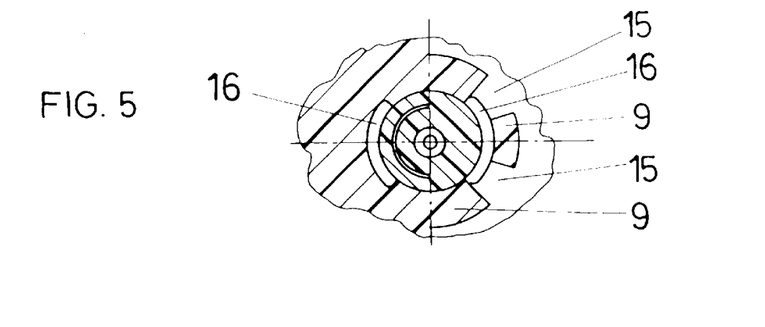
FIG. 5 shows a section through the drinking valve according to line V—V of FIG. 4.
Figure 6:
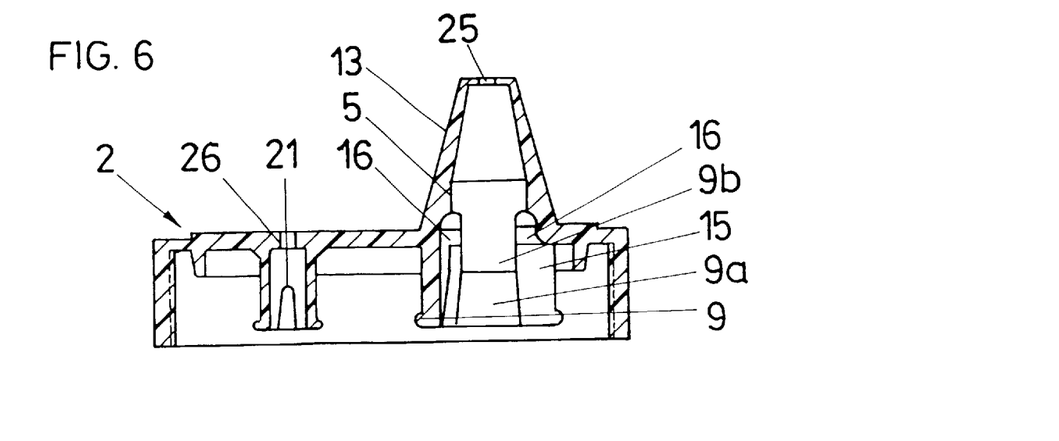
FIG. 6 shows a section through the container cap according to line II—II of FIG. 3, yet without the valve body.

The valve seat extension 9 has several (a total of, e.g., four) longitudinal slots 15 for the passage of liquid (FIGS. 3, 5 and 6), always two longitudinal slots 15 being connected via a peripherally extending depression 16 bordering on the valve seat 5. According to FIGS. 3 and 6, the two peripherally extending depressions 16 which each interconnect two of the longitudinal slots 15 are each delimited at their ends by a part 9b of the valve seat extension 9 following a slant inner wall 9a, the part 9b continuing flush into the valve seat 5. The slant inner wall 9a narrows from the front-side end of the socket-like valve seat extension 9 onwards so as to facilitate introduction of the valve body 6. The longitudinal slots 15 end at a position of the junction of the socket extension with the lower side of the lid body 2a proper of the container cap 2 to enable complete emptying of the container 1. The longitudinal slots 15 are open towards the front-side end of the socket-like valve seat extension 9. The liquid may get through the longitudinal slots 15 and through the depression 16 to the valve seat 5 so that sufficient liquid can be sucked out of the container 1.

Figure 2:
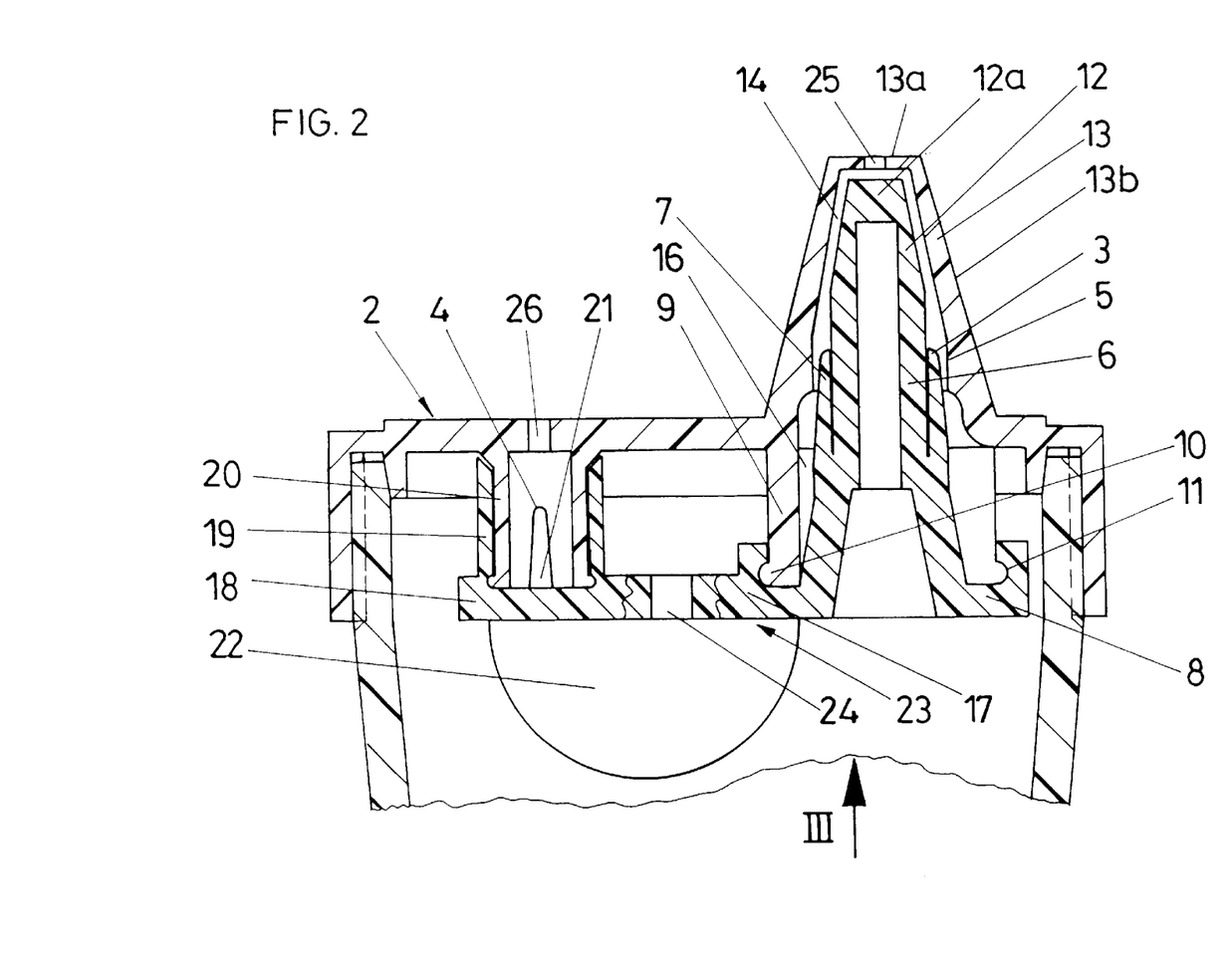
FIG. 2 shows a corresponding section according to line II—II of FIG. 3, of the container cap of this drinking container, wherein, however, the drinking valve is illustrated in the open position.
Figure 8:
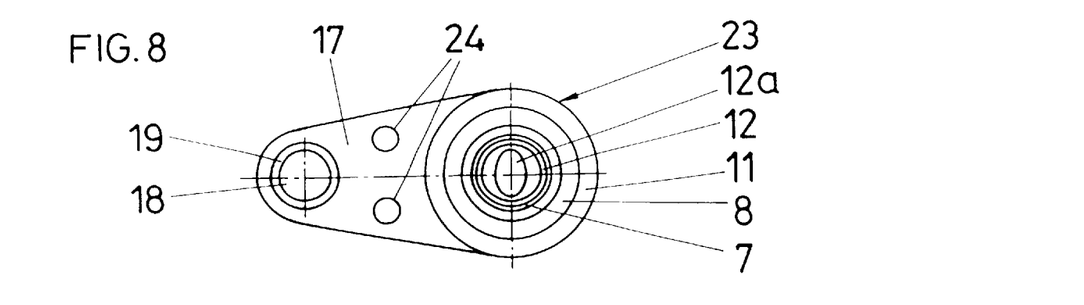
FIG. 8 shows a top view onto the valve body insert alone.

According to FIGS. 1, 2 and 8, the base part 8 is integrally formed with an elastomeric plate-shaped connecting body 17 which at the same time forms a base part 18 for an elastomeric, tubular valve body 19 of the air valve 4 provided with a chamfer at its front side, the valve body being slipped onto a tubular valve seat 20. The valve seat 20 likewise projects transversely to the main plane of the container cap 2 socket-like into the container interior, the diameter being shorter than the diameter of the valve seat extension 9 of the drinking valve 3, yet both of them projecting to the same extent into the container interior. Valve seat 20 has two slot-shaped air passages 21 (see FIGS. 3 and 6) which are open towards the front-side end of the socket-like valve seat 20. The front-side end 20a of the valve seat 20 is thickened and received in a latching groove 18a of base part 18.

On the connecting body 17 of the thus-formed integral elastomeric valve body insert 23, a plate-shaped handle 22 is mounted between the two valves 3, 4. By simply pulling on this handle 22, the valve body insert 23 can be pulled off valve seats 5, 20 once and in a very uncomplicated manner. Moreover, the connecting body 17 has two holes 24 by which the valve body insert 23 can be mounted in a dishwasher on the rods of inserts (cf. FIG. 8). Of course, also only one hole or more than two holes may be provided.

Figure 7:
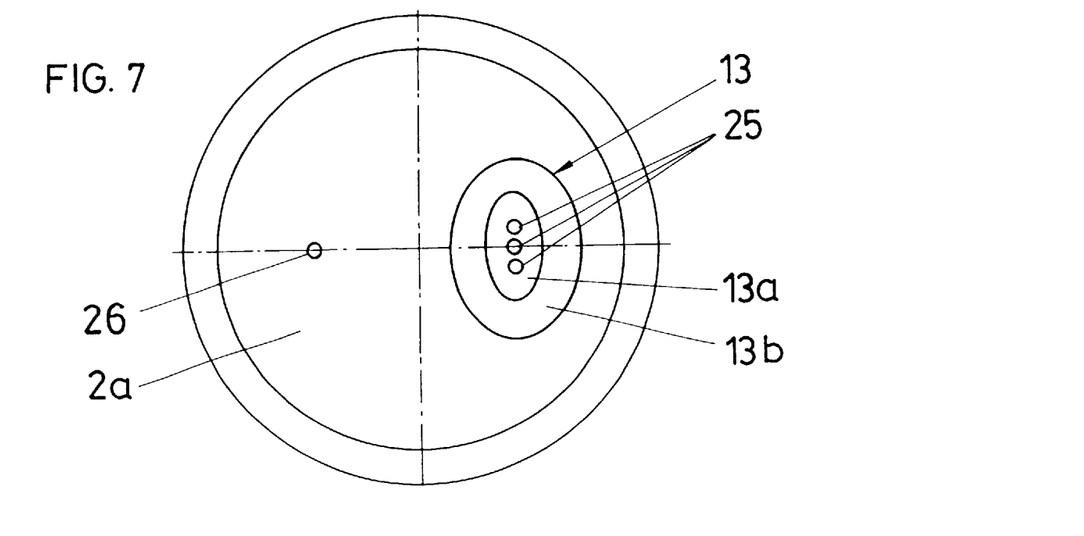
FIG. 7 is a top view onto the container cap.

Above the drinking valve 3, on the drinking spout 13, e.g. three drinking openings 25 are provided (see FIGS. 1, 2 and 7). These drinking openings 25 are provided at the highest position 13a of the drinking spout 13, the diameter of the drinking spout 13 increasing in the direction towards the upper surface of the container cap 2a. Above the air valve 4, at least one venting opening 26 is provided in the container cap (see FIGS. 3, 6, 7). On the one hand, these openings 25, 26 allow for the emergence of liquid from the drinking valve 3 (openings 25) and, on the other hand, for the entry of air to the valve seat 20 of the air valve (opening 26). Thus, if the drinking spout 13 is sucked at, the sealing lip 7 will be lifted off valve seat 5 and moved radially inwardly (see FIG. 2) so that liquid can flow through the passage channel 14 and out of the opening 25. If liquid is sucked out of the drinking container 1, compared to the surrounding pressure, a negative pressure will establish in container 1, and the higher external pressure of air thus will press on the inner wall of the valve body 19, whereby the latter will slightly be lifted off the valve seat 20 radially outwardly and air will flow through opening 26 as well as through the passage between valve body 19 and valve seat 20 into the interior of the container until a pressure equalization has taken place.

Figure 9:
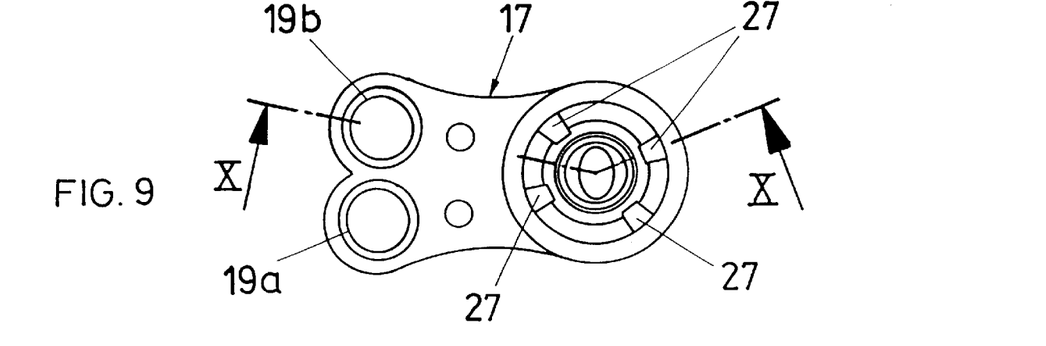
FIG. 9 shows a top view onto a modified valve body insert with two positions of the drinking valve and with two tubular valve bodies of an air valve.
Figure 10:
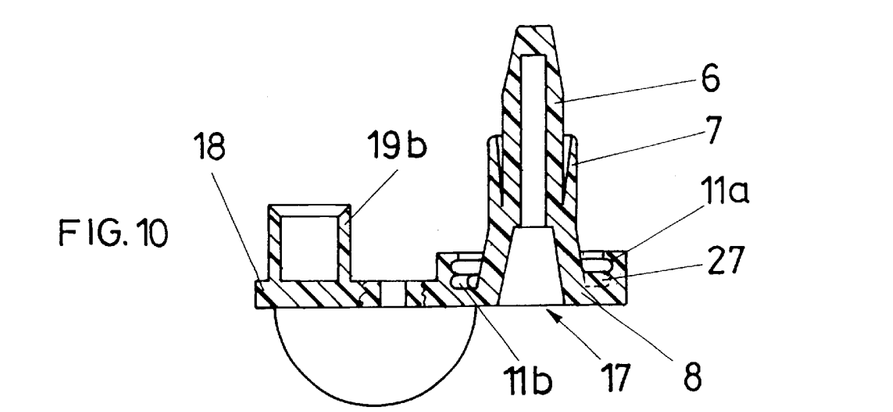
FIG. 10 shows a section through this valve body insert according to line X—X of FIG. 9.

According to FIG. 9, the connecting body 17 at the same time forms a base part 18 for two elastomeric, tubular valve bodies 19a, 19b of the air valve 4. Base part 8 of the valve body 6 of the drinking valve 3 is formed with, e.g., two (optionally also more) latching grooves 11a, 11b arranged one above the other (see FIGS. 10 to 12), of which the further inwardly arranged, inner latching groove 11b has four radial webs 27 (see FIG. 9).

Figure 11:
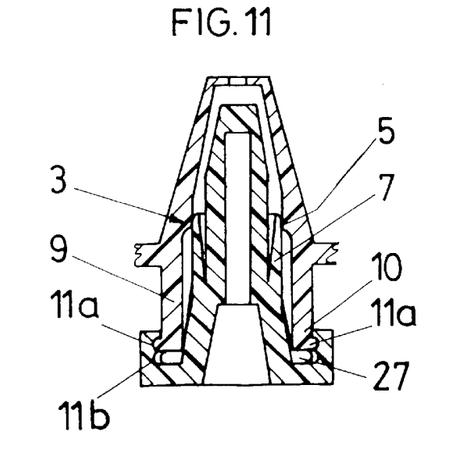
FIG. 11 shows a section through the drinking valve, with the valve seat extension being latched into the outer latching groove.

In the position according to FIG. 11, the base part 8 is slipped in such a rotational position on the socket-type valve seat extension that the webs 27 are peripherally offset relative to the longitudinal slots 15 so that they form a stop for the valve seat extension 9 when the valve seat extension latches with the base part 8, i.e. the base part 8 can only be pressed onto the valve seat extension 9 as far as to this illustrated latching position according to FIG. 11; in this rotational position of the base part 8, the tubular valve body 19a (see FIG. 9) is slipped onto the valve seat 20 of the air valve 4 (here not illustrated, yet see, e.g., FIGS. 1 to 3 and FIG. 6). In this latching position according to FIG. 11, only the frontmost part of the sealing lip 7 will abut the valve seat 5 so that a comparatively low suction pressure is required for liquid to flow out of the drinking container 1 through drinking valve 3.

Figure 12:
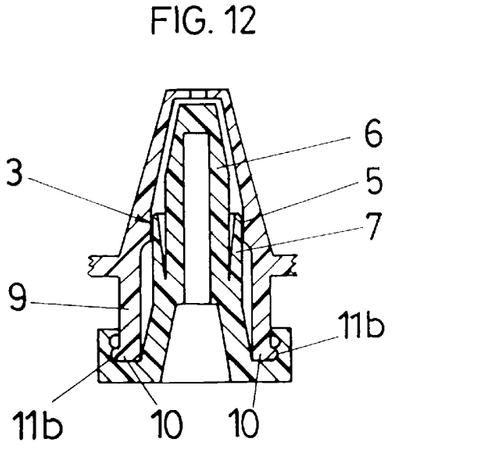
FIG. 12 shows a corresponding section through the drinking valve, with the valve seat extension now being latched in the deeper latching groove.

In the rotational position of the base part 8 according to FIG. 12, on the other hand, the tubular valve body 19b (FIG. 9) is slipped onto the valve seat 20 of the air valve 4 (see FIGS. 1 to 3 and FIG. 6), the webs 27 are directly aligned with the longitudinal slots 15 so that the valve seat extension 9 can entirely be pushed as far as into the deep latching groove 11b and there is latched. A substantially larger part of the sealing lip 7 now abuts on the valve seat 5, whereby a higher suction pressure is required to let liquid flow out of the drinking container 1 through the drinking valve 3.

What is claimed is:

1. A container cap for a drinking container comprising:
a drinking spout having inner and outer surfaces, at least one opening being formed therethrough, and having at least one valve seat formed on said inner surface with a socket-formed valve seat extension, and
a valve body made of an elastomeric material, said valve body having at least one sealing lip which is integrally connected with a base part,
wherein said valve body fits, at least partially, inside and is removably connected to said drinking spout, said at least one sealing lip extending from said base part in a direction towards said at least one drinking opening and in a closing position said at least one sealing lip abuts on said at least one valve seat, and wherein, in an opening position, said at least one sealing lip opens by deforming in a direction towards said valve body, providing a clear passage channel between said valve body and said inner surface of the drinking spout to said at least one drinking opening, and wherein the socket-formed valve seat extension has at least one snapping means for snapping the base part of the valve body thereonto.

2. A container cap according to claim 1, wherein the at least one valve seat is circumferentially closed and that the at least one sealing lip has a tubular configuration and, in the closing position, abuts the at least one valve seat.

3. A container cap according to claim 1, wherein the base part of the valve body has at least one latching groove corresponding to the snapping means of the socket-formed valve seat extension.

4. A container cap according to claim 6, wherein the base part of the valve body has several latching grooves arranged one above the other which cooperate with the one and the same snapping means of the socket-formed valve seat extension to attain different latching positions.

5. A container cap according to claim 4, wherein at least one radial web is provided in the most outwardly located from the valve body latching groove, the web being as high as said most outwardly located from the valve body latching groove and fitting into at least one longitudinal slot at a front side of the valve body.

6. A container cap according to claim 1, wherein the socket-formed valve seat extension has at least one longitudinal slot for liquid to pass therethrough.

7. A container cap according to claim 6, wherein two longitudinal slots are interconnected via a peripherally extending depression adjacent the valve seat.

8. A container cap according to claim 6, wherein the longitudinal slot extends as far as to the site of the junction between the socket-formed valve seat extension and a main plane of the container cap.

9. A container cap according to claim 1, wherein the base part, via a connecting body is connected in one piece with a base part for at least one elastomeric, tubular valve body of a further provided air valve, which is slipped onto a tubular valve seat extending substantially transversely to the main plane of the container cap in the region of at least one air entry opening.

10. A container cap according to claim 9, wherein the tubular valve seat of the air valve is formed with at least one air passage in the shape of a slot.

11. A container cap according to claim 10, wherein the slot length of the air passage is at least equal to half the height of the valve seat.

12. A container cap according to claim 9, wherein at least one handle projects from the connecting body.

13. A container cap according to claim 9, wherein the connecting body has at least one hole.

14. A container cap according to claim 1, wherein a connecting body forms a base part for several elastomeric, tubular valve bodies of an air valve, which are slipped onto a tubular valve seat extending substantially transversely to the main plane of the container cap.

15. A container cap according to claim 1, wherein the valve body is made of silicone caoutchouc or a thermoplastic elastomer.

16. A container cap according to claim 1, wherein the container cap is a screw lid provided with a drinking spout.

17. A drinking container, characterized in that it comprises a container cap according to claim 1.

18. A valve body insert comprising:

at least one sealing lip integrally formed with a base part;

a valve body extending from said base part and having a closed surface;

wherein said at least one sealing lip extends from said base part in a direction opposite said base part and adjacent said valve body;

wherein said at least one sealing lip is flexibly deformable in a direction toward said valve body;

wherein said valve body is made of an elastomeric material; and wherein the base part has at least one latching groove.

19. A valve body insert, according to claim 18, wherein the base part of the valve body has several latching grooves arranged one above the other and cooperating with a thickening of the valve seat extension to attain different latching positions.

20. A valve body insert according to claim 18, wherein the base part, via a connecting piece, is connected in one piece with a base part for at least one tubular valve body provided with an air valve.

21. A valve body insert according to claim 18, wherein a connecting body forms a base part for several elastomeric, tubular valve bodies for an air valve.

22. A valve body insert according to claim 21, wherein at least one handle projects from the connecting body.

23. A valve body insert according to claim 22, wherein the connecting body has at least one hole.

24. A valve body insert according to claim 18, wherein it is made of silicone caoutchouc or of a thermoplastic elastomer.

* * * * *